April 26, 1960 K. MEYER 2,934,421
PROCESS FOR PROVIDING SINTERING BED PELLETS
Filed Nov. 13, 1956
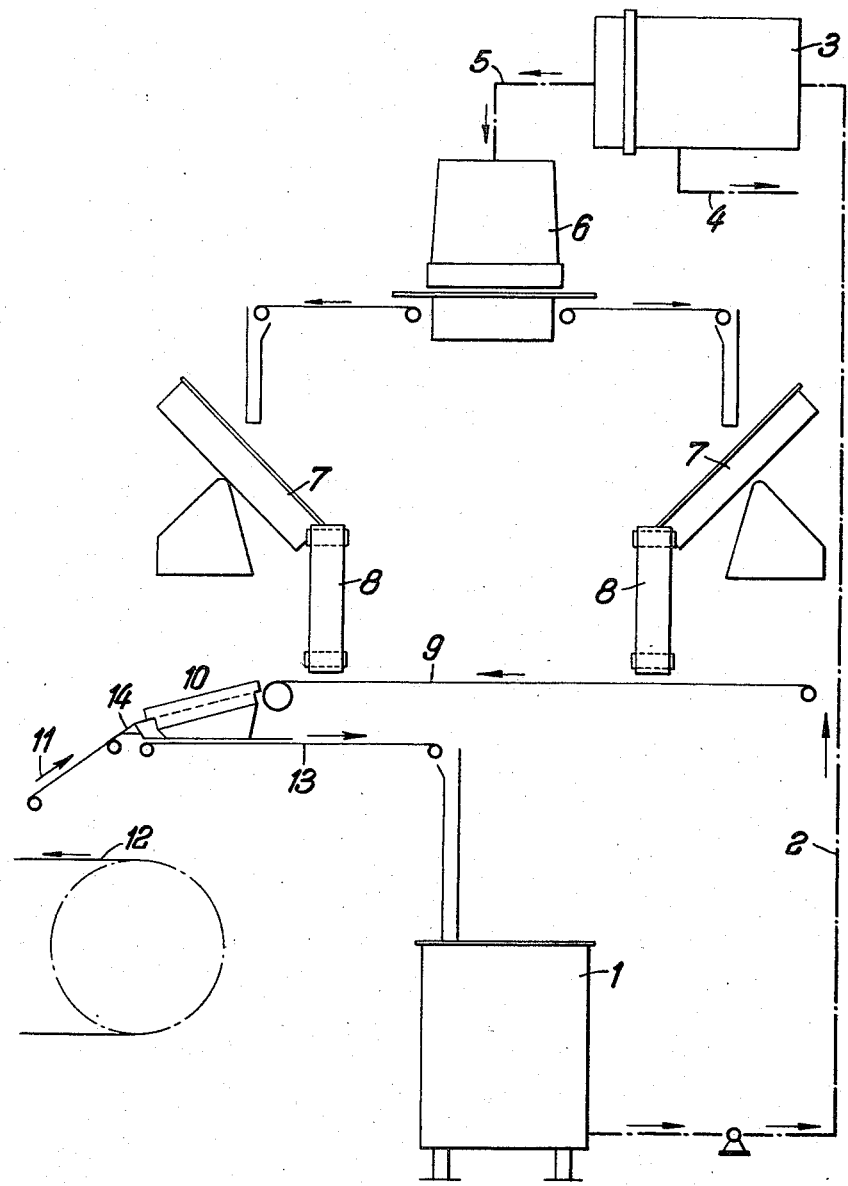
Inventor:
Kurt Meyer
By Bailey Stephens & Huettig
Attorneys

2,934,421
PROCESS FOR PROVIDING SINTERING BED PELLETS

Kurt Meyer, Frankfurt am Main, Germany, assignor to Metallgesellschaft Aktiengesellschaft, Frankfurt am Main, Germany Application November 13, 1956, Serial No. 621,746

Claims priority, application Germany December 13, 1955

2 Claims. (Cl. 75—3)

This invention relates to a process and apparatus for providing sintering bed pellets. In particular, the invention is directed to the granulating, agglomerating, or other binding together of fine particles into relatively coarse granules or pellets for use in a sinter bed.

Ordinarily, the gas permeability of the material charged onto a sinter grate or belt is increased by granulating such material. By granulating, it is meant the formation of relatively large granules from fine particles, by the agglomerating, granulating, pelletizing, or by other means by which the fine particles are bound together into larger granules. The material is granulated in any suitable apparatus, such as granulating drums or disks. Granulation is particularly essential when the material is initially composed of extremely fine particles, and in many instances such granulation is absolutely indispensable. For example, this is especially true when the material is a floatation-zinc blend, roasted pyrites, finely divided iron ores, magnet slimes, and the like. If such materials are not first granulated or pelletized, they cannot be roasted, calcined, or sintered economically on a sintering grate or belt. Consequently, with these materials and when relatively fine pellets are formed on the sintering belt, the material is always first granulated.

The freshly formed granules which are so-called green pellets are oftentimes mechanically fragile and sensitive. They will deform and/or stick together even after a relatively short time of storage in a stock pile, and even when stored in small quantities, and become set into a condition in which they are not usable on a sintering grate.

It also occurs that the normal operation of a sintering grate is subject to stoppages, even though temporary and of short duration, because of failures, and that such failures do not decrease substantially the average output of the sintering belt over a long period of time. However, such stoppages do cause an interruption of the sintering process and a reduction in the maximum output of the sintering apparatus. During the stoppages of the sintering apparatus, it is necessary to stock pile the green pellets being produced from the granulating apparatus and hold them in reserve until the sintering apparatus is again started. Such stock piling occurs in considerable quantities and the granules become affected with the disadvantages heretofore noted.

The objects of the instant invention are to produce a process and apparatus in which the green pellets are produced and used upon a sintering grate without the disadvantages of stock piling the same during stoppages of the sintering apparatus.

In general, these objects are accomplished by operating the granulating apparatus so that it produces a constant quantity of granules which at least correspond to the quantity required for forming the bed of the sintering grate. Any excess of green pellets is immediately returned to the raw supply for the granulating apparatus. This has the further advantage that the green pellets are again more readily granulated than the fine raw material alone into fresh green pellets for supply to a sintering grate.

The means by which the objects of the invention are obtained are more fully described with reference to the accompanying schematic drawing illustrating the apparatus and process.

The raw material, for example fine particles of floatation-zinc blend, is contained in raw material storage tank 1 having a stirrer therein and is pumped through pipe 2 into filter unit 3 wherein excess water is removed and discharged through pipe 4, and leaving the material in suitable condition for being granulated. The concentrated material flows through pipe 5 into a rotating vessel 6 which distributes the material to conveyors which pass the material to one or the other of a number of granulators which may be pelletizing disks 7. The fresh green pellets formed by granulators 7 are conveyed through either hoppers or better inclined belts 8 running reversely to the flow of material, from which the pellets are deposited upon a horizontal conveyor belt 9. From conveyor 9 the pellets flow onto a screen 10 and over a feed belt 11 to place pellets of sintering bed usable size onto the sintering grate or belt 12. Screen 10 removes the small-sized granules which drop onto return conveyor belt 13 which brings the fine granules back into raw material tank 1.

In this process and apparatus, the output of the pellet producing means is set to be a quantity at least as great as that required for the maximum capacity of sintering grate 12. If the capacity of grate 12 drops below the production rate of green pellets, the excess pellets of usable size are by-passed to return conveyor 13. This can be accomplished simply by means of a trap door 14 arranged at the outlet end of screen 10. However, the by-pass return conveyor can also be advantageously accomplished by using a depositing belt 11 which moves in a direction opposite to that of the downward flow of the granules thereover. At its normal speed of operation, this movement of depositing belt 11 brakes or reduces the falling velocity of the green pellets so that they will not be damaged when dropped onto grate 12. If a part or all of the green pellets are to be returned to belt 13, it is only necessary to increase the speed of belt 11 to such an extent that either some or all of the pellets are carried onto conveyor 13.

Inclined belts 8 are also moved in a direction counter to the flow of the green pellets, thus reducing their falling velocity. By regulating the speed of belts 8, a further granulation of the smaller particles coming from disks 7 can be obtained, this additional granulation being to such an extent that the greater portion of the granules reaching conveyor 9 are of a desired size. Otherwise, they are either sifted through screen 10 or carried upwardly by belt 11 so as to be returned to tank 1.

In another form of the invention, the production of green pellets in the granulating part of the apparatus is set to be about 10 percent above the maximum quantity required by the sintering grate. It is therefore insured that, under any conditions, a certain quantity of green pellets will be recycled over return belt 13. In fact, it has been found that the continuous recycling of the excess green pellets, both during the operation of the sintering grate and during stoppages thereof, is much more flexible than attempting to regulate the rate of feed of green pellets by temporarily shutting off and opening the recycling cycle.

Example

The installation for the production of green pellets preceding an installation for the production of burnt pellets from magnetite concentrate, having a capacity of 500 tons burnt pellets per 24 hours, is operated at a capacity corresponding to 550 tons unburnt pellets. The approximate composition of the concentrate is 67% iron in form of $Fe_3O_4$ and 3.5–6% $SiO_2$. The grain size distribution in the ore is about 70% below 325 mesh and 90% below 240 mesh.

In the agitator vessel 1 a sludge is contained, consisting of ore and water, which is pumped up by means of a pump through pipe 2 into the filters 3. In the filters 3, water is drawn off in such quantity that the filter cake charged through the conveyer belt 5 into the distributing bunker 6 contains about 13–15% water. The granulating plates 7 have together a granulating surface of 40 sq. m. Onto these plates, the humid mixture is charged at a rate of altogether 26 tons per hour. As the humidity content of the filter cake is sufficient for producing the green pellets, a further addition of water during the pelletizing process is not required. The green pellets will remain on the pelletizing plate for such length of time until they have reached a diameter of 1″. Then they will roll over the rim of the plate onto the counterrotating conveyer belt 8, and from there over the horizontal conveyer belt 9 onto the screen 10. The horizontal conveyer belt 9 is dimensioned in such a manner that the green pellets are transported in a bed height corresponding to one spherical diameter. The screen 10 removes about 1 ton per hour of broken pellets and other worn off material, which are fed back by the conveyer belt 13 into the agitator 1. The rotational speed of the counterrotating conveyer belt 11 is adjusted in such a manner that about 23.5 tons per hour green pellets are fed onto the sinter belt 12 and about 1.5 tons per hour to the conveyer belt 13.

When once the sintering machine had to be put out of service for five minutes owing to a temporary breakdown, the rotational speed of the counterrotating belt 11 was increased to such an extent that all green pellets having passed the screen 10, i.e. 25 tons per hour were transported back to the horizontal conveyer belt 13, so that the sinter belt ran idle.

Another time when the capacity of the sinter belt was temporarily increased to 520 tons per 24 hours, the rotational speed of the counterrotating conveyer belt was reduced to such an extent that only 0.5 ton green pellets per hour were charged onto the conveyer belt 13, the charge fed into the sintering machine amounting to 24.5 tons per hour.

Having now described the means by which the objects of the invention are obtained,

I claim:

1. A process of providing coarse pellets from fine particles for forming the bed on a sintering grate comprising producing pellets of sintering bed usable size from fine particles in an excess of the quantity required for making the bed, removing the required quantity of pellets produced for use in said bed, and directly recycling the remaining excess of pellets of the same usable size for use in the production of additional pellets without intermediate stock-piling of said remaining excess of pellets.

2. A process as in claim 1, further comprising disintegrating the excess of pellets into fine particles while being recycled for the production of additional pellets.

References Cited in the file of this patent

UNITED STATES PATENTS

| | | |
|---|---|---|
| 2,436,771 | Hood | Feb. 24, 1948 |
| 2,672,219 | Skillman | Mar. 16, 1954 |
| 2,750,273 | Lellep | June 12, 1956 |

FOREIGN PATENTS

| | | |
|---|---|---|
| 120,002 | Sweden | Oct. 28, 1947 |